United States Patent [19]

Bruguera

[11] 4,350,543

[45] Sep. 21, 1982

[54] UREA/FORMALDEHYDE ADHESIVES

[75] Inventor: Ramon Bruguera, Cervello, Spain

[73] Assignee: Patentes Y Novedades, S.A., Madrid, Spain

[21] Appl. No.: 172,225

[22] Filed: Jul. 23, 1980

Related U.S. Application Data

[62] Division of Ser. No. 26,918, Apr. 4, 1979, Pat. No. 4,246,152.

[51] Int. Cl.$^3$ ............................................... B29J 5/00
[52] U.S. Cl. ............................... 156/62.8; 156/331.3; 264/113; 264/122; 428/407; 428/528
[58] Field of Search ............... 156/331, 62.8; 427/212; 428/407, 528; 260/29.4 R; 264/113

[56] References Cited

U.S. PATENT DOCUMENTS 3,905,847 9/1975 Black ................................. 156/331

Primary Examiner—Theodore E. Pertilla
Attorney, Agent, or Firm—Dressler, Goldsmith, Shore, Sutker & Milnamow, Ltd.

[57] ABSTRACT

The invention relates to a process for the production of urea/formaldehyde adhesives and to the adhesives thus obtained.

According to the invention, an inorganic salt is mixed with a source of formaldehyde, the resulting mixture is heated and reacted with urea to initiate polymerization in an acid medium, the polymerization reaction is stopped when the mixture has reached the required viscosity, the mixture is cooled, urea is added to the mixture during cooling and the adhesive is obtained after cooling.

The adhesives obtained may be used in the production of agglomerated or laminated panels of wood.

2 Claims, No Drawings

UREA/FORMALDEHYDE ADHESIVES

This is a division of application Ser. No. 26,918, filed Apr. 4, 1979, U.S. Pat. No. 4,246,152, issued Feb. 20, 1981.

This invention relates to urea/formaldehyde adhesives.

Urea/formaldehyde adhesives are used, in particular, as binders in the production of agglomerated or laminated panels obtained, respectively, by the compression with the application of heat of essentially cellulosic particles, such as wood chips or shavings, or other similar particles impregnable with these adhesives, or by the compression with the application of heat of sheets or panels of wood.

An object of, the present invention is to produce highly stable urea/formaldehyde adhesives by whih it is possible to produce agglomerated or laminated panels which are characterised by a high bond strength by virtue of the adhesive binding the constituent elements thereof and which, in certain cases, have advantages over other types of urea/formaldehyde adhesives.

According to the present invention, this object is achieved by incorporating an inorganic salt in the production of the adhesive in such a way that this salt takes part in a polymerisation reaction by reacting with the starting materials used for the production of the adhesive.

In this way, it is possible to obtain an adhesive which has the qualities required for the particular application envisaged, which is already prepolymerised and of which the polymerisation may subsequently be terminated without difficulty during production of the panels by compression under heat.

The thus-produced adhesive remains stable without changing viscosity for several months at a temperature of 25° C. or at higher storage temperatures. In addition, where such an adhesive is used in the production of agglomerated or laminated panels, the quality of the panels obtained is improved, being characterised by higher bond strength, i.e. internal cohesion, values.

In addition, the thus-produced adhesive retains its reactivity to the ammoniacal salts and acids normally used as catalysts in the production of the panels.

Furthermore, an adhesive of the type in question may be produced using different molar ratios of formaldehyde to urea, in addition to which the conditions under which the panels are produced (e.g. compression time and pressure) are the same as in the case of conventinal urea/formaldehyde adhesive.

Accordingly, the present invention relates to a process for the production of a urea/formaldehyde adhesive which is characterised in that an inorganic salt is mixed with a source of formaldehyde, the resulting mixture is heated and reacted with urea to initiate a polymerisation reaction in an acid medium, the polymerisation reaction is stopped when the mixture has reached the required viscosity, urea is added to the mixture during cooling and the adhesive is obtained after cooling.

The formaldehyde source used may be an aqueous solution of formaldehyde, more or less polymerised formaldehyde, paraformaldehyde or even formaldehyde already pre-condensed with urea.

Where an aqueous formaldehyde solution is used as the formaldehyde source, two additions of urea are made during heating before the polymerisation reaction is stopped.

The starting aqueous formaldehyde solution may be commercially available solution.

The solution most widely used is a 37% solution which contains enough methanol to prevent the precipitation of solid polymer under normal delivery and storage conditions. However, it is also possible to use more highly concentrated formaldehyde or even paraformaldehyde.

Where a 37% aqueous formaldehyde solution is used, the inorganic salt is added to it in such a quantity that the molar ratio of inorganic salt to formaldehyde amounts to from 0.015:1 to 0.35:1. After the inorganic salt has been added, the mixture is heated, a first addition of urea is made when the temperature of the mixture has reached approximately 50° C. in such a quantity that the molar ratio of formaldehyde to urea obtained amounts to about 2.65:1, heating is continued and a second addition of urea is made when the temperature of the mixture has reached about 100° C. in such a quantity that the molar ratio of formaldehyde to urea obtained amounts to from 2.0:1 to 2.65:1.

Where a urea/formaldehyde precondensate is used as the formaldehyde source, an addition of urea is made during heating of the mixture.

The urea/formaldehyde precondensate used as formaldehyde source may be commercially available urea/formaldehyde precondensate.

The precondensates in question generally have the following characteristics:

active concentration (urea+formaldehyde):60 to 85% molar ratio of formaldehyde to urea:4:1 to 6:1.

These precondensates have the advantage of a high formaldehyde concentration coupled with very high stability (more than 6 months) and of considerably simplifying the production of urea/formaldehyde adhesives.

There are several known processes for the production of urea/formaldehyde precondensates which differ chiefly in the way in which the formaldehyde is obtained:

absorbing gaseous formaldehyde in highly concentrated solutions of urea;

Concentrating normal aqeous solutions of formaldehyde and stabilising them using urea;

directly reacting highly concentrated solutions of formaldehyde (from 69 to 70%) with urea.

Where a urea/formaldehyde precondensate is used as the starting material, the stages, involved in the production of a conventional urea/formaldehyde adhesive are the same as in the case where a solution of formaldehyde is used as starting material, apart from the fact that it is not normally necessary to remove water as a final step.

The quantity of salt added to the urea/formaldehyde precondensate is such that the molar ratio of salt to formaldehyde amounts to from 0.015:1 to 0.35:1.

Heating of the mixture may be commenced either before addition of the salt and water or immediately afterwards.

Urea is then added when the temperature of the mixture has reached from 60° to 65° C. in such a quantity that the ratio of formaldehyde to urea obtained amounts to from 2.0:1 to 2.65:1.

After this first addition of urea, the pH is adjusted to from 5 to 6.5, heating is continued until the mixture reaches a temperature of from 80° to 100° C. and the polymerisation reaction is stopped.

In the two above-mentioned cases, the mixture has the same qualities after the first addition of urea has been made, irrespective of the type of formaldehyde source used, and the rest of the operation is continued in the same way.

When the mixture has reached the required viscosity, the polymerisation reaction is stopped by rendering the mixture alkaline, for example by adding a solution of sodium hydroxide, when the temperature of the mixture is from 80° to 100° C.

The mixture is then cooled and a second addition of urea is made when the temperature of the mixture has reached from 60° to 80° C. in such a quantity that the ratio of formaldehyde to urea obtained amounts to from 1.5:1 to 2.0:1.

The excess water is optionally removed by distillation in vacuo, after which the mixture is cooled to ambient temperature or to a slightly higher temperature, i.e. to a temperature of from 20° to 35° C., and the pH is adjusted to a value of from 8.0 to 8.5.

The adhesive obtained may then be used in the production of agglomerated or laminated panels.

In the process according to the present invention, the urea may be partly replaced by melamine to improve the resistance of the adhesive to water where it is used in the production of agglomerated or laminated panels intended for external use.

The inorganic salt used in the process according to the present invention may be a soluble inorganic salt, such as an alkali metal or alkaline earth metal salt particularly an alkali metal or alkaline earth metal halide or a mineral acid/alkali metal or alkaline earth metal salt, such as an alkali metal sulphate.

Examples of salts suitable for use in the process according to the present invention are magnesium chloride, potassium chloride, sodium chloride, calcium chloride, potassium bromide, sodium bromide and sodium sulphate.

One or more of the additives normally used in conventional urea/formaldehyde adhesives, such as additives improving the qualities of the adhesive or the panels obtained, for example flameproofing additives, may be incorporated in the adhesives according to the present invention.

Urea/formaldehyde adhesives according to the present invention are used in the same way as conventional urea/formaldehyde adhesives for the production of agglomerated or laminated panels.

The working conditions (e.g. temperature pressure and compression time) depend, in particular, on the density and thickness of the panel to be agglomerated and the selection of such parameters is familiar to those skilled in the art. In general, the temperature from 100° to 200° C. and the pressure from 2 to 30 kg/cm$^2$.

The quantity in which the adhesive is used amounts to from 5 to 15 parts, by weight, expressed as 100% dry matter, per 100 parts of particles to be agglomerated.

The following Examples illustrate the present invention.

EXAMPLE 1

The starting material used is a urea/formaldehyde precondensate in which the molar ratio of formaldehyde to urea is 5:1 and of which the pH is from 7.3 to 7.5. This precondensate is heated to a temperature of from 60° to 65° C. An inorganic salt is then dissolved in the precondensate with the quantity of water necessary to keep the final solids content of the adhesive at its normal value of 65±1% and the quantity of inorganic salt added is such that the molar ratio of inorganic salt to formaldehyde amounts to from 0.015:1 to 0.35:1.

When the salt is completely dissolved (temperatures from 60° to 65° C.), a first quantity of urea is added in such a way that the molar ratio of formaldehyde to urea is from 2.1:1 to 2.3:1, after which heating is continued. The pH is checked at 50° C. and should normally be from 6.3 to 6.6.

Heating is continued to 100° C. and the mixture is maintained under reflux, the pH and the viscosity being periodically checked. The pH has to be maintained at from 6.3 to 6.5. If necessary, the pH may be reduced by adding 10% formic acid during the reaction. However, this is generally not necessary.

The polymerisation reaction is stopped by the addition of a 50% sodium hydroxide solution when the viscosity of the mixture has reached the value required for each type of adhesive.

The mixture is then cooled to from 70° to 90° C. and a second addition or urea is made in such a quantity that the molar ratio of formaldehyde to urea amounts to from 1.53:1 to 1.59:1. After this addition, the product is cooled to a temperature of from 20° to 35° C. and, finally, the pH is adjusted to from 8.0 to 8.5.

The adhesive may then be used for the production of agglomerated or laminated wood panels.

EXAMPLE 2

The starting material used is a urea/formaldehyde precondensate in which the molar ratio of formaldehyde to urea is 4.8:1. Water is added in the quantity necessary for the final adhesive to have a dry residue content of normally from 60 to 70% by weight. If necessary, the pH of the precondensate is adjusted to from 7.2 to 8.0.

The inorganic salt is then added in such a quantity that the molar ratio of formaldehyde to salt is from 0.015:1 to 0.35:1.

Alternatively, the salt may be completely or partly dissolved in water before it is added to the precondensate. The mixture is then heated to 60° C. and a first addition of urea is made in such a quantity that the molar ratio of formaldehyde to urea amounts to from 2.2:1 to 2.5:1 after this addition.

Heating is continued to 80° C. and the pH is adjusted to from 5.8 to 6.0 at that teperature. The pH and the viscosity of the mixture are periodically checked.

The polymerisation reaction is stopped by the addition of a sodium hydroxide solution when the viscosity of the mixture has reached 5000 cps at 25° C. Cooling is continued to 60° C. and a second addition of urea is made in such a quantity that the ratio of formaldehyde to urea amounts to from 1.8:1 to 2.0:1. After this addition, the product is cooled to 20° C. and, finally, the pH is adjusted to from 8.0 to 8.5. The adhesive obtained is ready for use.

By way of illustration, the following quantities may be used:

100 kg of urea/formaldehyde precondensate containing 60% of formaldehyde and 25% of urea are mixed with 40 kg of water and 20 kg of potassium chloride. The first addition of urea amounts to 23 kg and the second addition of urea to 12 kg. The quantity of adhesive thus obtained amounts to 195 kg.

Such an adhesive is particularly suitable for the production of laminated wood panels.

EXAMPLE 3

The starting material used is a 37%, by weight, aqueous solution of formaldehyde. The pH is adjusted to a slightly alkaline value, i.e from 7.0 to 8.0, and the inorganic salt is added. Heating is commenced and, when the temperature reaches 50° C., the first addition of urea is made in such a quantity that the molar ratio of formaldehyde to urea amounts to 2.65:1. When the temperature reaches 100° C., the pH is adjusted to from 5.8 to 6.2. 30 minutes later, the second addition of urea is made in such a quantity that the molar ratio of formaldehyde to urea amounts to from 2.0 to 2.25:1. The reaction is stopped by rendering the mixture slightly alkaline when the viscosity of the mixture amounts to 35 cps at 25° C.

Cooling is continued to 80° C. and a third addition of urea is made in such a quantity that the molar ratio of formaldehyde to urea amounts to from 1.45:1 to 1.6:1.

The excess water is eliminated by distillation in vacuo and the adhesive is cooled to 20° C. The pH is adjusted to from 8.0 to 8.5 and the viscosity of the thus-obtained adhesive amounts to from 350 to 500 cps.

By way of illustration, the following quantities may be used.
  150 kg of a 37% aqueous formaldehyde solution
  20 kg of sodium bromide
  42 kg of urea (first addition)
  8 kg of urea (second addition)
  22 kg of urea (third addition).

The quantity of adhesive thus obtained amounts to approximately 200 kg.

Such an adhesive is particularly suitable for the production of agglomerated wood panels.

EXAMPLE 4

The starting material used is a urea/formaldehyde precondensate having a molar ratio of formaldehyde to urea of 5:1.

If necessary, the pH is adjusted to from 7.2 to 8.0, after which the water and the inorganic salt, potassium bromide, are added.

The mixture is heated to 60° C., after which a first addition of urea is made in such a quantity that the molar ratio of formaldehyde to urea amounts to from 2.1:1 to 2.4:1 after this addition. Heating is continued to 95° C. and the pH is adjusted to from 5.9 to 6.1 at that temperature.

The pH and viscosity of the mixture are periodically checked. The polymerisation reaction is stopped by the addition of a sodium hydroxide solution when the viscosity of the mixture amounts to 1300 cps at 25° C. The mixture is then cooled to 60° C. and a second addition of urea is made in such a quantity that the molar ratio of formaldehyde to urea amounts to from 1.5:1 to 1.7:1.

By way of illustration, the following quantities may be used:
  115 kg of urea/formaldehyde precondensate containing 50% of formaldehyde and 20% of urea are mixed with 22 kg of potassium bromide and 15 kg of water.
  The first addition of urea amounts to 32 kg.
  The second addition of urea amounts to 20 kg.
  The quantity of adhesive thus obtained amounts to approximately 200 kg.

Such an adhesive is particularly suitable for the production of agglomerated wood panels.

EXAMPLE 5

This Example illustrates the production on a laboratory scale of an agglomerated wood panel consisting of three layers, namely two surface layers and an intermediate layer.

(1) Starting materials (a) Wood

The wood used is 100% pine, the size of the particles amounting to from 0.15 to 15 mm. The smallest particles are used for forming the surface layers.

(b) Adhesive

The adhesive used may be the adhesive of Example 3 or the adhesive of Example 4 or another similar adhesive prepared by incorporating the inorganic salt in the polymerisation reaction. The adhesive has a solids content of 65±1%.

(2) Formation of the layers (a) Surface layers

The ratio between the solids in the adhesive and the dry particles of wood amounts to 10%, by weight.

973 g of wood particles are used in conjunction with 175 g of a binder mixture containing 135 g of adhesive, from 0.27 to 0.41 g of $NH_4Cl$, from 5.3 to 10.6 g of paraffin wax (50%) and from 30 to 35 g of water.

(b) Intermediate layer

The ratio between the solids in the adhesive and the dry particles of wood amounts to 8%, by weight.

1629 g of wood particles are used in conjunction with 248 g of a binder mixture containing 191 g of adhesive, from 1.5 to 1.9 g of $NH_4Cl$, from 9.3 to 17.6 g of paraffin wax (50%) and from 38 to 46 g of water.

On an industrial scale, the quantity of water used depends on several factors:
  (a) the type of installation: for example, with or without pre-compression and temperature of the sheets;
  (b) the type of machine used for bonding: for example, centrifugal machine or spray.

The theoretical density of the finished agglomerated panel amounts to from 680 to 690 kg/m$^3$. The panel obtained measures 500×500×17.5 mm.

(3) Compression step

A press of the Siempelkamp type is used. A square layer is formed using a quantity of particles sufficient to obtain the density indicated above and a thickness of 16 mm. The temperature prevailing during compression is 150° C., whilst the pressure varies from 3 to 25 kg/cm$^2$ with two intermediate venting stages during the cycle.

All the qualities of urea/formaldehyde adhesives mentioned above may be obtained irrespective of the type of formaldehyde source used (aqueous solution, paraformaldehyde, concentrated formaldehyde, urea/formaldehyde precondensate).

What is claimed is:

1. A process for the production of an agglomerated wooden material comprising binding a particulate wooden material using a urea/formaldehyde adhesive obtained by mixing an inorganic salt with a formaldehyde source, heating the resulting mixture and reacting the resulting mixture with urea to initiate polymerization in an acid medium at a pH between 5 and 6.5, the polymerization reaction being stopped by rendering the reaction mixture alkaline when the mixture has reached a required viscosity and urea being added to the mixture during cooling to give the adhesive after cooling.

2. A process for the production of laminated material comprising bonding layers of a wooden material using a urea-formaldehyde adhesive obtained by mixing an inorganic salt with a formaldehyde source, heating the resulting mixture and reacting the resulting mixture with urea to initiate polymerization in an acid medium at a pH between 5 and 6.5, the polymerization reaction being stopped by rendering the reaction mixture alkaline when the mixture has reached a required viscosity and urea being added to the mixture during cooling to give the adhesive after cooling.

* * * * *